(12) United States Patent
Kompelien

(10) Patent No.: US 6,490,174 B1
(45) Date of Patent: Dec. 3, 2002

(54) ELECTRONIC INTERFACE FOR POWER STEALING CIRCUIT

(75) Inventor: Arlon Kompelien, Crosslake, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/873,717

(22) Filed: Jun. 4, 2001

(51) Int. Cl.[7] .......................... H02M 3/335; G05F 1/652
(52) U.S. Cl. ......................................... 363/16; 323/282
(58) Field of Search ..................... 363/16, 17; 323/280, 323/281, 282, 312, 313, 316, 317; 330/278, 279, 283, 293

(56) References Cited

U.S. PATENT DOCUMENTS

| | | | | |
|---|---|---|---|---|
| 4,451,779 A | * | 5/1984 | Griep | 323/312 |
| 4,542,350 A | * | 9/1985 | Akazawa et al. | 330/293 |
| 5,153,499 A | * | 10/1992 | Klesh | 323/280 |
| 5,381,082 A | * | 1/1995 | Schlicht | 323/280 |
| 5,465,041 A | * | 11/1995 | Sanders et al. | 323/312 |
| 5,768,116 A | | 6/1998 | Kompelien | 363/59 |
| 5,903,139 A | * | 5/1999 | Kompelien | 323/282 |

* cited by examiner

Primary Examiner—Rajnikant B. Patel

(57) ABSTRACT

An interface circuit cooperates with an existing power-stealing circuit designed for use with low voltage AC power. The existing power-stealing circuit provides low voltage DC power for operating an auxiliary circuit and for switching power for an AC load. The existing power-stealing circuit has a semiconductor switch for switching power to the AC load, and a control circuit that when the load receives power, shuts off the semiconductor switch near the zero crossing points in the power voltage waveform and converts the voltage to DC for use by the auxiliary circuit. The interface circuit is interposed between the semiconductor switch and the control circuit of the power-stealing circuit, and reduces the high voltage AC power to the lower voltage for which the power-stealing circuit was designed. In a preferred embodiment, a power field effect transistor drops the voltage applied to the control circuit to a level compatible with the control circuit while the semiconductor switch is open and the load unpowered.

11 Claims, 2 Drawing Sheets

ELECTRONIC INTERFACE FOR POWER STEALING CIRCUIT

BACKGROUND OF THE INVENTION

Before electronic thermostats were available, electromechanical thermostats relied on energy provided by the temperature changes in the controlled space to operate a very low force switch, typically a mercury switch, and hence had no need for electrical operating power. These thermostats typically activated the heating or cooling plants they controlled by switching low voltage (i.e., 24 v.) AC power to a HVAC controller. The HVAC controller then switched 24 v. AC power to the various components of the plant, such as the gas valve and igniter in the heating plant or to the contactor controlling high voltage power for the air conditioning compressor and fan. But the electronic thermostats widely used nowadays typically require a constant supply of electrical power. In typical existing installations, two or three wires connect the thermostat to the plant. To run additional wires solely for operating power is often quite labor intensive, and hence relatively expensive. If external power is to be used, additional wires are necessary because when the thermostat switch closes, no power is available across the switch at the thermostat from the wires supplying power to the heating or cooling plant while the plant is operating. The voltage drop across the thermostat's internal switch element is essentially zero while the switch is closed. Adding impedance to the switch to create a constant small voltage drop is undesirable because this generates heat within the enclosure, affecting thermostat operation. And for some controllers, impedance in the wires supplying power may affect controller operation.

Alternative internal power sources for thermostats are problematic. As previously mentioned, running a separate set of power wires to the thermostat solves the problem of supplying power for thermostats, and in new construction this is easy to do. But for older buildings in which an electronic thermostat is being retrofitted, this may be very difficult.

To address these problems, I earlier developed an alternative power source for thermostats that involved what I call power stealing. This power source is an electronic circuit that, while the thermostat is conducting current to the controller, takes a small section (typically no more than a few tens of $\mu$sec.) of the beginning of each half of the low voltage AC cycles of the controller current, converts it to DC, and filters and regulates the stolen power voltage to the 3 v. that the thermostat circuitry uses. The amount of power stolen is so small that the HVAC controller operation is unaffected. I implemented this power-stealing function in an electronic circuit that uses little power and takes little space on the circuit board of the thermostat. My U.S. patents numbered U.S. Pat. No. 5,768,116 (issued Jun. 16, 1998) and U.S. Pat. No. 5,903,139 (issued-May 11, 1999) describe the power-stealing circuit and its operation, and these patents are incorporated by reference into this specification.

Briefly, the power-stealing circuit controls a pair of power field effect transistors (power FETs) to switch 24 v. AC to the HVAC controller or other load. When the controller is receiving power, the power-stealing circuit turns the power FETs off for a short period of time before and after each time the voltage crosses the 0 v. line and when the power voltage is relatively low. This allows the circuit to resynchronize with the AC wave, and to divert load current to a 3 v. supply capacitor. When the power voltage reaches 4 v. or so in each half cycle and the capacitor is fully charged, the power-stealing circuit causes the power FETs to again conduct and redirect power away from the 3 v. capacitor. The power "stolen" from each half cycle immediately after each zero crossing and used to charge the 3 v. capacitor then provides the operating voltage for the thermostat control circuitry.

Some thermostats and other similar types of controllers operate on line voltage, typically either 117 or 220 v. AC. The current version of the power-stealing circuit is implemented in an ASIC (application-specific integrated circuit) that is not compatible with such voltage levels. It would be possible to redesign the ASIC for compatibility with line voltage. However, this is not presently preferred because of the expense of redesigning and requalifying the existing 24 v. version of the ASIC.

BRIEF DESCRIPTION OF THE INVENTION

I have developed an interface circuit that allows an existing power-stealing control circuit designed for low AC voltage power to operate successfully with line voltage power. Such an interface circuit cooperates with a first semiconductor switch of the type having a control terminal and first and second power terminals and similar to the power FETs used for switching power by the original design. The first semiconductor switch has first and second power terminals for connection in series with the load to control power applied to the load. The first switch conducts between the first and second power terminals responsive to a conduction signal at the control terminal. The control circuit has first and second power terminals connected in parallel with the first semiconductor switch power terminals. The control circuit has a switch terminal for receiving an on/off signal having first and second levels, and a switch control terminal providing the conduction signal to the first semiconductor switch for a period of time between successive zero crossings by the AC voltage responsive to the first level of the on/off signal. A storage element cooperates with the control circuit to store power available across the first semiconductor switch while the conduction signal is absent, and provides the stored power as a low DC voltage.

The interface circuit allows the existing low voltage control circuit design to operate with line AC voltage levels. The interface circuit comprises a variable impedance element connected between the first semiconductor switch first power terminal and the control circuit first power terminal. The variable impedance element functions to clip the voltage at the control circuit first power terminal to a peak voltage on the order of the low voltage AC power.

In a preferred embodiment the interface circuit includes a first variable semiconductor impedance having a first power terminal connected to the first semiconductor switch first power terminal, a second power terminal connected to the control circuit first power terminal, and a control terminal. The first variable semiconductor impedance has an impedance value dependent on the voltage between the control terminal and the second power terminal of the first variable semiconductor impedance. A voltage reference element provides a voltage to the first variable semiconductor impedance on the order of the peak voltage of the relatively low AC voltage. When the load is not receiving power, the first variable impedance assumes an internal impedance that creates sufficient voltage drop to hold the voltage applied to the control circuit to a level on the order of the low AC voltage level.

DETAILED DESCRIPTION OF THE EMBODIMENTS

Figure 1:
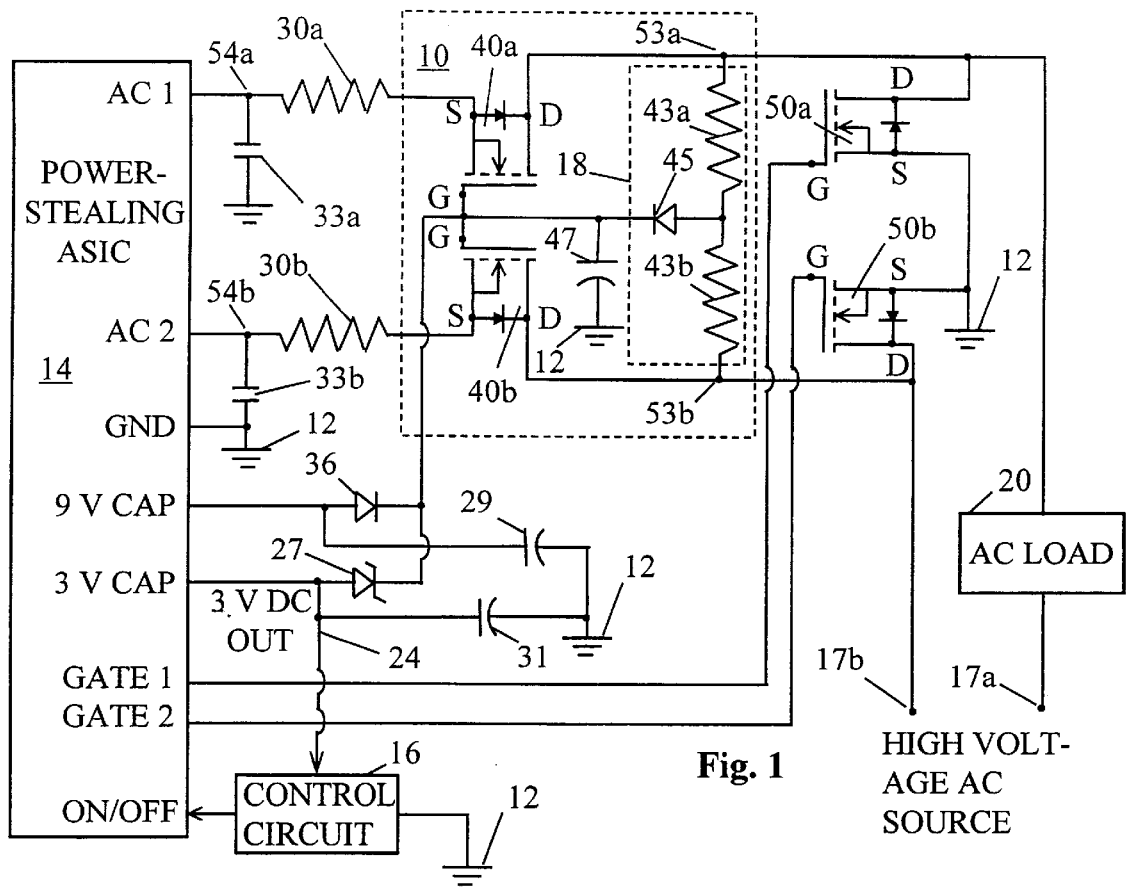
FIG. 1 is a circuit diagram of a preferred embodiment of the invention.

The preferred embodiment of the invention is shown in FIG. 1 as an interface circuit 10 that cooperates with an existing power-stealing control circuit 14 originally designed to operate with standard 24 VAC supplied at terminals 17a and 17b and with power FETs compatible with 24 v. operation and similar to those shown at 50a and 50b. FETs 50a and 50b serve as semiconductor switches for switching power applied to load 20. Circuit 14 performs two functions. One is to control (i.e., switch) power to an AC load 20 by providing a control voltage to the power FETs 50a and 50b. The other is to supply DC power for use by another circuit, such as an auxiliary control circuit 16. Circuit 14 was developed to allow 24 VAC at terminals 17a and 17b to power both load 20 and circuit 16. As mentioned earlier, control circuit 16 often is of the type providing temperature control functions. Circuit 14 has AC 1 and AC 2 terminals that each serve as a first power terminal, and a system common connection at the GND terminal that serves as a second power terminal. An ON/OFF terminal serves as a switch terminal. GATE 1 and GATE 2 terminals serve as switch control terminals for controlling operation of FETs 50a and 50b.

In its present embodiment, circuit 14 is an ASIC (application-specific integrated circuit). It would be possible to redesign circuit 14 for inherent compatibility with high voltage or line power, but this requires the expense of redesigning a relatively complex microcircuit, and then preparing the tooling, testing the new circuit, etc. (By line voltage here is meant voltages such as 117 VAC or 230 VAC RMS. Such voltage levels are RMS, with peak voltages referenced to ground on the order of 165 or 330 v.) Further, a microcircuit package for handling relatively high voltages requires special design considerations. I have judged it easer in this specific application to use off-the-shelf components specifically designed to handle high voltage to reduce the voltage to a level compatible with the microcircuit. Lastly, by having only one circuit for two different applications, there are cost savings because of the returns to scale.

The operation of circuit 14 is described in detail in U.S. Pat. No. 5,903,139, but it is convenient to describe portions of circuit 14 operation briefly with reference to the waveforms of FIG. 3. Other features of circuit 14 will be described in conjunction with the explanation of circuit 10. To understand the operation of circuit 14, it is first of all necessary to understand the operation of power field effect transistors such as power FETs 50a and 50b. The FETs used in FIG. 1 are so-called negative channel FETs. Power FETs have a drain terminal D, a source terminal S, and a gate terminal G. Impedance $Z_{DS}$ between the drain and source terminals is controlled by the voltage difference $V_{GS}$ between the gate and source terminals. Power FETs are one type of semiconductor switch having first and second power terminals and a control terminal respectively corresponding to the source terminal, the drain terminal, and the gate terminal. Standard transistors are another. When $V_{GS}$ is less positive than a small positive cut-off voltage, typically a few volts, $Z_{DS}$ is very large, and little current flows through the power FET. If $V_{GS}$ is somewhat more positive than the cut-off voltage, then $Z_{DS}$ is very small, so the drain to source (and source to drain) voltage drop accordingly becoming quite small, for some types of power FETs on the order of millivolts. Some power FETs have a linear operating region where $Z_{DS}$ changes relatively little for a preselected change in $V_{GS}$. FETs 40a and 40b in FIGS. 1 and 2 should have this linear response where $Z_{DS}$ varies through several orders of magnitude from low to high as $V_{GS}$ varies through a range of a few volts from high to low.

Figure 2:
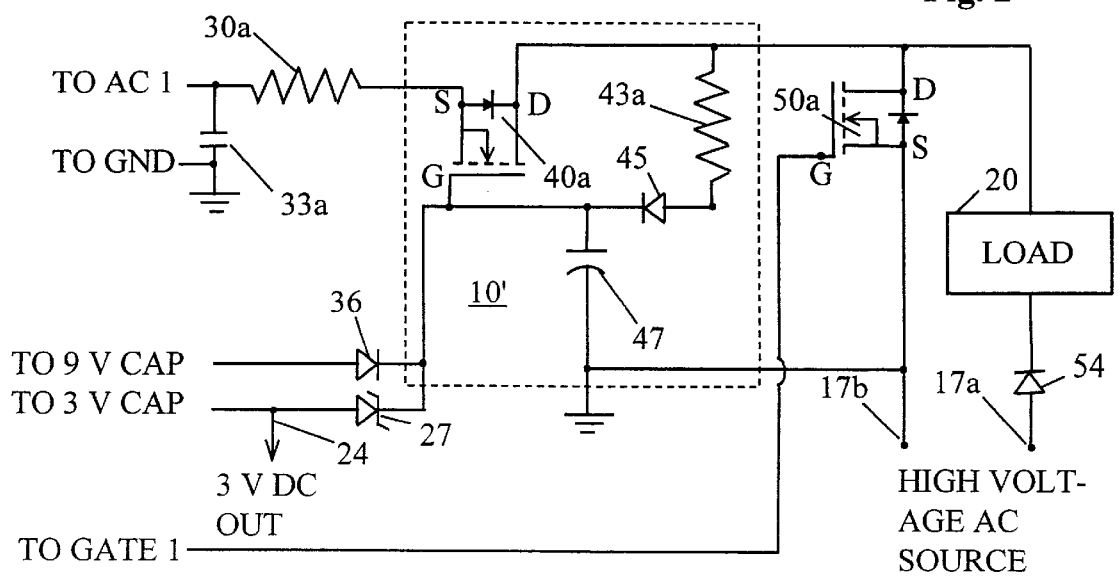
FIG. 2 is a circuit diagram of a simplified embodiment of the invention.

Present FETs include what is called a body diode, shown with a standard diode symbol in each FET symbol in FIGS. 1 and 2. For the negative channel FETs involved here, the body diode is reverse biased when the FET drain voltage exceeds the source voltage, and forward biased when the source voltage exceeds the drain voltage. When forward biased in excess of about 0.7 v., the body diode conducts in the manner typical for a normal diode. Thus, these negative channel FETs will always conduct in the reverse direction, but with a different amount of voltage drop, depending on whether the FET is switched on or not. For most FETs, the internal impedance between the gate and source terminals is very large, so a very small current flow into the gate terminal can control a large current flow between the drain and source terminals. A number of different types of power FETs are available. For efficient operation I use for all of the FETs in FIG. 1, low resistance negative channel FETs. Other types may be equally suitable for other circuits designed to provide the functions of my circuit 10.

Figure 3:
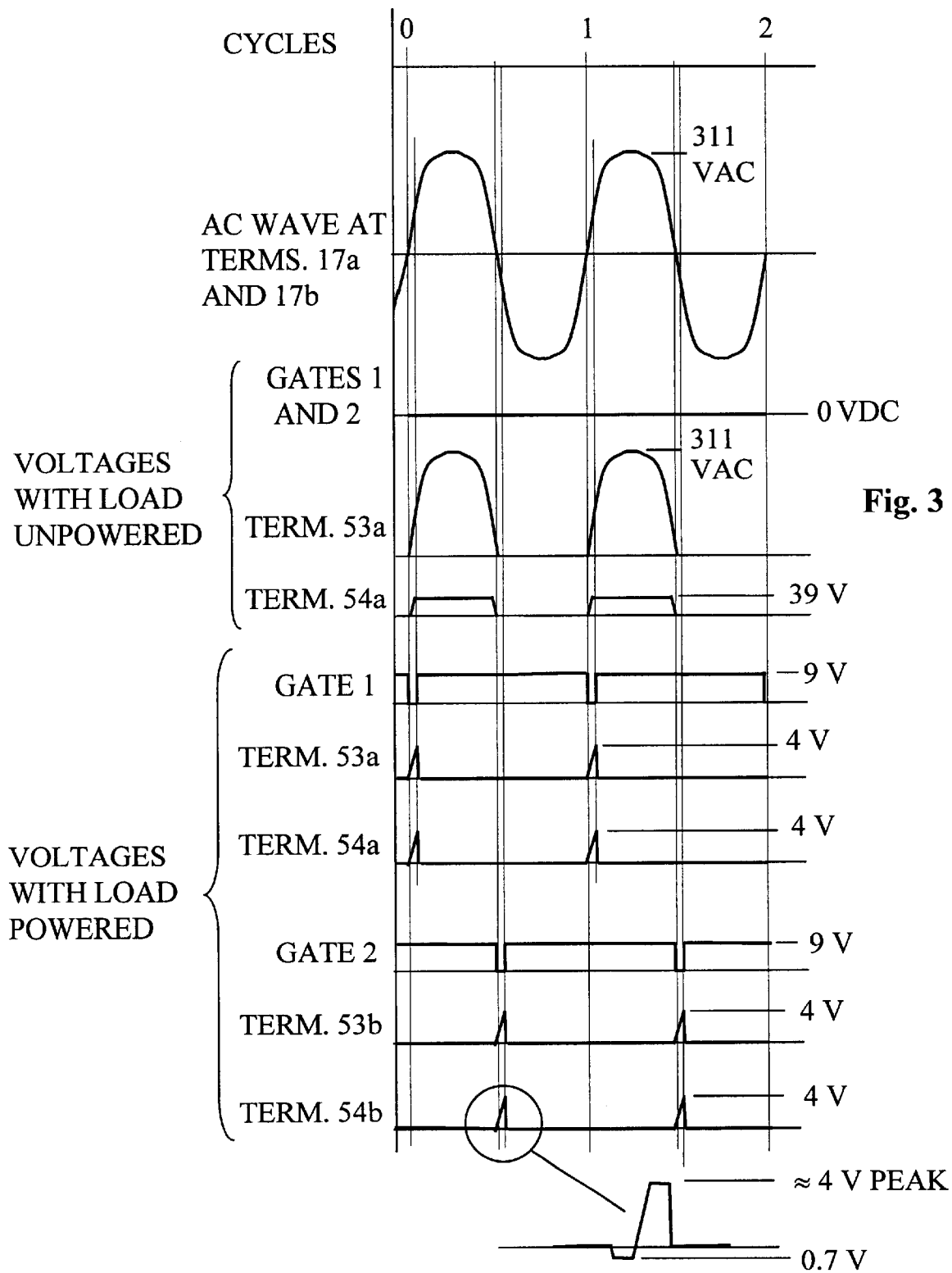
FIG. 3 is a graph of waveforms illustrating the operation of the invention.

For purposes of explaining the operation of the invention as embodied in circuit 10, FIG. 3 shows voltages at various points within the FIG. 1 circuit for slightly more than two complete cycles of the AC waveform present between terminals 17a and 17b. The waveform between terminals 17a and 17b is assumed to be a sine, although the invention as embodied in circuit 10, as well as the existing circuit 14, are also capable of operating in a half wave mode (see FIG. 2) and also with high voltage DC. For purposes of explaining the invention, each complete cycle can be considered identical. An individual point on the AC waveform or any other waveform shown can be identified as a decimal fraction of the cycle. For example, the zero crossing between the positive and negative halves of a cycle can be identified as Cycle Point 0.5. The waveforms for FIG. 3 represent full wave operation for single phase 220 v. AC, but the circuits of FIGS. 1 and 2 are equally suitable for 117 v. AC. The peak AC voltage is shown as 311 v. in FIG. 3 because AC voltage levels with sine waveforms are by convention identified with their RMS values, and sine wave peaks are about 141% ($\sqrt{2}$) higher than the RMS value. The voltage scales differ from one waveform to the next in FIG. 3, but the peak is specified for each. With the exception of the voltage shown for the AC wave, all of these voltages are measured with respect to the system common 12. The system common 12 in FIG. 1 is not earth ground, but simply indicates a common connection point. The voltage at this point with respect to earth ground will usually not be 0 v. This means that circuits 10, 14, and 16 should be isolated from earth ground.

Circuit 14 operates to cause FETs 50a and 50b to simulate a mechanical switch. While this "switch" is closed, circuit 14 controls the conductive state of FETs 50a and 50b to provide a small amount of DC power for an auxiliary circuit such as circuit 16. While FETs 50a and 50b are non-conductive, circuit 10 operates to provide voltage of reduced level to circuit 14. To provide these functions, the circuit of FIG. 1 has essentially two different modes of operation depending on the conduction state of power FETs 50a and 50b. The first mode is when power FETs 50a and 50b are not conducting (the "switch" they are simulating is open), causing load 20 to be, for all practical purposes, unpowered. Voltages shown in FIG. 3 associated with the Load-Unpowered mode are labeled "VOLTAGES WITH LOAD UNPOWERED". The second mode is when load 20 is powered, and power FETs 50*a* and 50*b* are conducting (most of the time). Voltages shown in FIG. 3 associated with the Load-Powered mode are labeled "VOLTAGES WITH LOAD POWERED".

The GATE 1 and GATE 2 voltage waveforms in FIG. 3 show the different voltages provided by circuit 14 at its GATE 1 and GATE 2 outputs. These GATE 1 and GATE 2 voltages are applied to the gate terminals of power FETs 50*a* and 50*b*, to switch them on or off. Circuit 14 sets the level of the GATE 1 and GATE 2 voltages depending on the level of the ON/OFF signal supplied by control circuit 16 to circuit 14. Power FETs 50*a* and 50*b* are on when the GATE 1 and GATE 2 control voltages are high. A skilled designer will realize that a power FET 50*a* or 50*b* selected to operate with 24 VAC power may not have the maximum voltage rating required to operate with line voltage. Power FETs 50*a* and 50*b* with ratings for switching line voltage power for AC load 20 are satisfactory. One suitable available device is the Motorola MTW24N40E power FET, which can switch several hundred volts.

Circuit 16 has its operating power terminals connected between the 3 V CAP terminal (terminal 24) and system common 12. Circuit 14 can provide only a relatively small amount of 3 v. filtered DC current at terminal 24 for powering circuit 16, but circuit 16 can usually be designed to operate satisfactorily with a maximum of perhaps 10 ma. Circuit 14 is designed so that even while power FETs 50*a* and 50*b* are providing operating power to load 20, a small amount of filtered 3 v. DC power is constantly available to operate circuit 16. Circuit 16 should in any case require relatively little power for operation to prevent load 20 from operating improperly due to excess current passing through it in the Load-Unpowered mode.

The interface circuit 10 functions to provide power to circuit 14 when load 20 is both unpowered and powered. The operation of both circuits 10 and 14 differs depending on the mode of operation. In both modes however, power FETs 40*a* and 40*b* function to connect the drain terminal of power FETs 50*a* and 50*b* respectively to the AC1 and AC2 terminals of circuit 14 through resistors 30*a* and 30*b*. Resistors 30*a* and 30*b* form RC circuits with capacitors 33*a* and 33*b* for absorbing brief voltage surges arising from switching by FETs 50*a* and 50*b* or from line voltage surges, and have little else to do with the operation of circuits 10 and 14. Values for resistors 30*a* and 30*b* may range from 12–24. Capacitors 33*a* and 33*b* may be on the order of 0.001 $\mu$fd.

Power FETs 40*a* and 40*b* form the heart of the invention, and should be selected to handle close to line voltages. Circuits 14 and 16 ideally use very little current, so FETs 40*a* and 40*b* have very little heat to dissipate in both the Load-Powered and Load-Unpowered modes. One available device suitable for use as power FETs 40*a* and 40*b* is the Motorola MTP2N60E power FET. Selecting this device for power FETs 40*a* and 40*b* allows power FETs 40*a* and 40*b* to function as variable impedance semiconductor devices when load 20 is unpowered.

Load-Unpowered Mode of Operation

After startup, with circuit 14 and interface circuit 10 operating in steady state, circuit 14 responds to the relevant signal at the ON/OFF terminal by providing a steady 0 v. to the gates of power FETs 50*a* and 50*b* as shown in FIG. 3, making power FETs 50*a* and 50*b* nonconductive. A full wave rectifier circuit 18 comprising resistors 43*a* and 43*b* and diode 45 charges capacitor 47. Resistors 43*a* and 43*b* may be quite large, on the order of a megohm, since FETs 40*a* and 40*b* require very little control current. The current provided by rectifier circuit 18 charges capacitor 47 to a level providing sufficient voltage for the gate terminals of power FETs 40*a* and 40*b* to cause power FETs 40*a* and 40*b* to conduct. Capacitor 47 may have a value on the order of 10 $\mu$fd. A voltage regulator circuit comprising a zener diode 27 and the voltage of approximate 3 v. provided at a 3 V CAP terminal of circuit 14 by the internal circuit 14 components, limits the voltage across capacitor 47. The 3 V CAP terminal forms a low DC power terminal at which circuit 14 provides a low level of 3 v. DC power for control circuit 16. Zener diode 27 may have a reverse voltage drop of around 39 v. with low zener current. The 3 v. potential at the 3 V CAP terminal plus the zener drop limits the voltage applied to the gate terminals of power FETs 40*a* and 40*b* to about 42 v. DC. The rectifier circuit 18 can charge capacitor 47 to a relatively high voltage. But as voltage rises at terminals 53*a* and 53*b* during a cycle, the voltage regulator circuit 18 functions to limit capacitor 47 voltage to the 3 v. plus the zener diode 27 drop.

With the voltage at the gate terminals of power FETs 40*a* and 40*b* held to around 42 v., the voltage at terminals 54*a* and 54*b* is held to somewhat less than that level. The actual voltage at terminals 54*a* and 54*b* depends on the characteristics of power FETs 40*a* and 40*b*. With the gate terminal voltage of FETs 40*a* and 40*b* nearly constant at about 42 v., the amount of impedance between the drain and source terminals of FETs 40*a* and 40*b* varies during a half cycle of the AC wave as FETs 40*a* and 40*b* operate in their linear range. The greater the difference between the source and gate (control) terminal voltage of say FET 40*a*, the lower is the impedance of the FET. As the instantaneous voltage of the AC wave increases, the voltage at terminals 54*a* and 54*b* rises as well, decreasing the voltage difference between the FET 40*a* and 40*b* gate and source terminals. This increases the impedance of FETs 40*a* and 40*b*, and the amount of voltage drop across them. As the terminals 54*a* and 54*b* voltages rise to within about 3 v. of the FET 40*a* and 40*b* gate voltages of about 42 v., power FETs 40*a* and 40*b* begin to operate in their linear range to limit the voltage at terminals 54*a* and 54*b* to a maximum peak voltage on the order of 39 v. at terminals 54*a* and 54*b*. This voltage wave approximates the 24 v. RMS (40 v. peak) applied to terminals 54*a* and 54*b* with load 20 unpowered when operating with the 24 v. AC power for which circuit 14 was originally designed. This voltage waveform is sufficiently close to a sine wave for normal operation by circuit 14. Thus, AC voltage of 117 v. or 230 v. at terminals 17*a* and 17*b* is clipped to a peak of approximately 40 v. AC at terminals 54*a* and 54*b*, see FIG. 3. One suitable device for zener diode 27 available from a number of manufacturers is identified as a type 1N4716 with the specified forward drop of 39 v. and a current capacity of 50 $\mu$amp. I prefer to connect zener diode 27 between the 3 V CAP terminal and the gates of power FETs 40*a* and 40*b* in order to scavenge for operating control circuit 16, any excess rectifier 18 current, thereby increasing capacity and efficiency of the FIG. 1 circuit. This scavenged current should be less than that required by control circuit 16. Diode 27 can also be connected to system common 12 with somewhat reduced capacity and efficiency, and in this case may have a reverse drop of 42 v.

A capacitor 31 is connected between this 3 V CAP terminal and system common 12 to filter the 3 v. DC power and to serve as a power storage element. Circuit 14 operates to maintain at the 3 V CAP terminal, approximately 3 v. with a maximum current of perhaps 10–15 ma. available to power control circuit 16. DC current provided at the 3 V CAP terminal divides between control circuit 16 and capacitor 31, allowing for simultaneously operating circuit 16 and maintaining the charge on capacitor 31. The value of capacitor 31 may range from 0.1 to about 1000 μfd. Circuit 14 also provides 9 v. DC for internal circuitry in circuit 14 and for conduction voltage at the GATE 1 and GATE 2 terminals for the gates of FETs 50*a* and 50*b*. This 9 v. DC is externally available at a 9 V CAP terminal to allow external filtering and current storage by capacitor 29. The value of capacitor 29 may range between 0.1 and about 30 μfd.

AC load 20 must be of the type that remains non-operational with the small amount of current flowing through it in the Load-Unpowered mode. Most common AC loads fulfill this requirement.

Circuit 14 is designed so that when power is first applied to terminals 17*a* and 17*b*, the GATE 1 and GATE 2 terminals provide 0 v. to the gates of power FETs 50*a* and 50*b*. This places FETs 50*a* and 50*b* in their nonconductive mode, so that the system is operating in the Load-Unpowered mode. However, at startup, no voltage is available at the gate terminals of power FETs 40*a* and 40*b* to place them in conduction. A second purpose of rectifier circuit 18 is to provide voltage. during system startup to capacitor 47 and to the FET 40*a* and 40*b* gate terminals to place FETs 40*a* and 40*b* in conduction to allow power to flow to the circuit 14 AC 1 and AC 2 terminals. Once FETs 40*a* and 40*b* are conducting even a small amount of current, circuit 14 can execute an internal startup process that charges capacitors 29 and 31 and allows a transition to steady state operation.

The power dissipation of power FETs 40*a* and 40*b* in the Load-Unpowered mode is a possible concern because the current drawn by circuits 14 and 16 during this mode also generates heat in power FETs 40*a* and 40*b*. However, the effective impedance of circuits 14 and 16 between system common 12 and the AC 1 and AC 2 terminals is on the order of thousands of ohms, so the actual current flow through power FETs 40*a* and 40*b* in the Load-Unpowered mode is typically only a few ma., resulting in minimal heat generation in FETs 40*a* and 40*b*. Thus, the $I^2R$ heat generated in power FETs 40*a* and 40*b* is sufficiently low to allow for normal operation of any temperature sensor located in control circuit 16.

Load-Powered Mode Operation

In this mode, circuit 14 responds to the appropriate signal at the ON/OFF terminal by generating the GATE 1 and GATE 2 waveforms shown in the "Load Powered" waveform group of FIG. 3. In general, the gate terminal voltage for power FETs 50*a* and 50*b* is held at about 9 v. by the GATE 1 and GATE 2 terminals of circuit 14. However, just before each Cycle Point 0.0 and 0.5, circuit 14 drops the GATE 1 or GATE 2 voltage to 0 v., which completely turns off the respective power FET 50*a* or 50*b* during these times except for the slight current carried in that FET's body diode until the voltage nears 0 v. As can be seen in FIG. 3, during the Load-Unpowered mode, FET 50*a* is briefly turned off near Cycle Points 0.0, 1.0, etc. and FET 50*b* is turned off near Cycle Points 0.5, 1.5, etc. After the zero crossing while either FET 50*a* or 50*b* is nonconductive, the body diode is reverse biased and no current flows to load 20. Immediately after the zero crossing, voltage at terminal 53*a* or 53*b* follows the AC voltage. Because FETs 40*a* and 40*b* are both fully conductive during this time, the wave shape at terminal 54*b* close to Cycle Point 0.5 in the Load-Powered mode accurately represents the voltage waveforms near the zero crossings at terminals 53*a* and 53*b*, as well as at terminal 54*a*. The terminal 54*b* wave shape is shown with reasonable accuracy expanded in both the time and magnitude axes in the adjacent inset. After the voltage reaches about +4 v. following each zero crossing, current flows through FET 40*a* or 40*b* into circuit 14 and is used to charge capacitor 31. During this brief time, the voltage at terminal 54*b* is held near 4 v. When the voltage at capacitor 31 rises above 3 v. while capacitor is being replenished during the power FETs 50*a* and 50*b* off times, internal gates in circuit 14 provide the 9 v. level also available at the 9 V CAP terminal to the power FET 50*a* and 50*b* gate terminals, and power FETs 50*a* and 50*b* are turned fully on. The exact point in the cycle at which circuit 14 causes the GATE 1 and GATE 2 signals to return FETs 50*a* and 50*b* to conduction depends on the time required to charge capacitor 31. If capacitor 31 is charged to above 3 v., the intervals in which FETs 50*a* and 50*b* do not conduct are shortened slightly by circuit 14. If capacitor 31 voltage falls to below about 3 v., the intervals in which FETs 50*a* and 50*b* do not conduct are lengthened slightly by circuit 14. Circuit 14 keeps FET 50*b* conductive while FET 50*a* is not conducting and vice versa, so that current flow during this time is through the conduction channel of the conducting FET rather than through its body diode, whose 0.7 v. drop will generate substantially more internal heating than will the conducting channel. This functionality is inherent in the design of circuit 14.

The charge in capacitor 31 provides the operating current for circuits 14 and 16 during the times that FETs 50*a* and 50*b* are fully conducting. As the voltage across capacitor 31 will usually fall slightly during FET 50*a* and 50*b* conducting times, the off time of each of the FETs 50*a* and 50*b* will usually be used to restore or replenish the charge on capacitor 31.

The voltage waveforms present at terminals 53*a* and 53*b* in the Load-Powered mode have nominal peaks of 4 v., and are of very short duration. These waveforms when applied to rectifier circuit 18 are thus insufficient to maintain voltage at the power FET 40*a* and 40*b* gate terminals adequate for full conduction by FETs 40*a* and 40*b*. Conveniently however, circuit 14 continuously has 9 v. externally available at the 9 V CAP terminal. I use a diode 36 to connect the 9 V CAP terminal to the power FET 40*a* and 40*b* gate terminals. With the typical 0.7 v. diode drop in diode 36, this provides a constant voltage in excess of 8 v. at the gate terminals of FETs 40*a* and 40*b*, more than adequate to hold FETs 40*a* and 40*b* in continuous full conduction. Since the voltage at terminals 53*a* and 53*b* in the Load-Powered mode peaks at nominal 4 v., there is no need to limit the voltage at terminals 54*a* and 56*b* in this mode by operating FETs 40*a* and 40*b* in their linear range. With FETs 40*a* and 40*b* held in full conduction, the voltage drop through them is nearly 0 v., which explains why the voltage at terminals 54*a* and 56*b* is nearly identical to that at terminals 53*a* and 53*b* as shown in FIG. 3. This voltage wave is adequate to allow circuit 14 to continue to supply the 3 v. DC to control circuit 16 in the same manner that circuit 14 would function with low voltage AC at terminals 17*a* and 17*b*. The current used by the gates of FETs 40*a* and 40*b* is so small that the operation of circuit 14 and FETs 50*a* and 50*b* requiring the 9 V CAP current is unaffected.

In essence, the voltage at the gate terminals of FETs 40*a* and 40*b* regardless of the mode in which circuit 14 is operating, is the higher of the voltage provided by rectifier circuit 18, capacitor 47, and zener diode 27 on the one hand, or the 9 V CAP terminal voltage of circuit 14. This arrangement assures that there is no conflict between the rectifier circuit 18 and the voltage regulator circuit (zener diode 27)

in the Load-Unpowered mode with the 9 v. applied during the Load-Powered mode, and the voltage applied to the power FETs 40*a* and 40*b* gate terminals is correct for the present mode.

The circuit of FIG. 1 can operate with half wave or DC power at terminals 17*a* and 17*b* as well as with full wave AC power. The circuit of FIG. 1 is needed for loads 20 that may actually change their load characteristics from full wave to half wave or DC operation. The commercial version of circuit 14 has the ability to detect the type of power available at terminals 17*a* and 17*b*, and change its mode of operating to be compatible with the applied power. This is of no more than marginal relevance to understanding the invention.

FIG. 2 shows a half wave or DC power version of interface circuit 10 shown in FIG. 1 and operates very similarly. An interface circuit 10' operates in a half wave or DC mode in a manner similar to that for circuit 10 of FIG. 1. FIG. 2 is not a preferred design but is a possible design for use in systems using high voltage half wave or DC power. The FIG. 2 circuit illustrates the built-in capabilities of the commercial embodiment for circuit 14 that allow circuit 14 to operate in both a half wave mode with line voltage as shown in FIG. 2, and also in a high voltage DC mode. The same reference numbers have been used in both FIGS. to identify similar components.

I claim:

1. An interface circuit for converting to high AC voltage use, a power-stealing circuit designed for switching a relatively low AC voltage for a load and for providing low voltage DC power for use by a separate load, said power-stealing circuit comprising:

a) a first semiconductor switch of the type having a control terminal, said first semiconductor switch having first and second power terminals for connection in series with the load and conducting between the first and second power terminals responsive to a conduction signal at the control terminal;

b) a control circuit having first and second power terminals for connection across the first semiconductor switch power terminals, said control circuit having a switch terminal for receiving an on/off signal having first and second levels, and a switch control terminal providing the conduction signal to the first semiconductor switch for a period of time between successive zero crossings by the AC voltage responsive to the first level of the on/off signal, and having a low DC terminal providing low voltage DC power; and c) a storage element storing the power available across the first semiconductor switch while the conduction signal is absent and while the first level of the on/off signal is present, and providing the stored power to the control circuit, wherein said interface circuit comprises a variable impedance element connected between the first semiconductor switch first power terminal and the control circuit first power terminal, said variable impedance element functioning to clip the voltage at the control circuit first power terminal.

2. The interface circuit of claim 1, wherein the variable impedance element comprises i) a first variable impedance semiconductor device having a first power terminal connected to the first semiconductor switch first power terminal, a second power terminal connected to the control circuit first power terminal, and a control terminal, said first variable impedance semiconductor device having an impedance value dependent on the voltage between the control terminal and the second power terminal of the first variable semiconductor impedance; and ii) a voltage reference element providing a voltage to the first variable semiconductor impedance device's control terminal.

3. The interface circuit of claim 2, wherein the first variable impedance semiconductor device comprises a power FET.

4. The interface circuit of claim 3, wherein the voltage reference element comprises a zener diode connected to the first variable semiconductor impedance control terminal.

5. The interface circuit of claim 4, wherein the voltage reference element is connected between the low DC terminal of the control circuit and the variable semiconductor impedance control terminal.

6. The interface circuit of claim 5, wherein the voltage reference element includes a rectifier circuit connected across the power terminals of the first semiconductor switch and providing a DC voltage to the variable impedance semiconductor device.

7. The interface circuit of claim 6 wherein the rectifier circuit comprises a pair of series-connected resistors connected between the first and second power terminals of the semiconductor switch, a diode connecting the series-connected resistors to the power FET gate terminal, and a capacitor connected to the diode.

8. The interface circuit of claim 1, wherein the first variable impedance semiconductor device comprises a power FET.

9. The interface circuit of claim 8, wherein the power FET is of the type having a linear range, where a range of voltages applied to the control terminal produces a range of impedances between the power terminals.

10. The interface circuit of claim 2 for use with a control circuit further including an intermediate voltage level terminal providing voltage sufficient to place the first variable impedance semiconductor device in full conduction, wherein the interface circuit includes a conducting element connecting the intermediate voltage level terminal of the control circuit to the control terminal of the first variable impedance semiconductor device.

11. The interface circuit of claim 10, wherein the conducting element comprises a diode.

* * * * *